United States Patent
Kulkarni et al.

(10) Patent No.: US 11,314,305 B2
(45) Date of Patent: Apr. 26, 2022

(54) DYNAMIC THERMAL MANAGEMENT SIMULATION USING IMPROVED REDUCED ORDER MODELING

(71) Applicant: ANSYS, INC., Canonsburg, PA (US)

(72) Inventors: Aniket Abhay Kulkarni, Pune (IN); Shitalkumar Joshi, Pune (IN)

(73) Assignee: ANSYS, INC., Canonsburg, PA (US)

( * ) Notice: Subject to any disclaimer, the term of this patent is extended or adjusted under 35 U.S.C. 154(b) by 226 days.

(21) Appl. No.: 16/590,234

(22) Filed: Oct. 1, 2019

(65) Prior Publication Data

US 2020/0363856 A1  Nov. 19, 2020

Related U.S. Application Data

(60) Provisional application No. 62/846,964, filed on May 13, 2019.

(51) Int. Cl.
| | |
|---|---|
| *G06F 1/3203* | (2019.01) |
| *G06F 1/20* | (2006.01) |
| *G06F 30/20* | (2020.01) |
| *G06F 111/10* | (2020.01) |

(52) U.S. Cl.
CPC .......... *G06F 1/3203* (2013.01); *G06F 1/206* (2013.01); *G06F 30/20* (2020.01); *G06F 2111/10* (2020.01)

(58) Field of Classification Search
CPC ........ G06F 1/3203; G06F 1/206; G06F 30/20; G06F 2111/10
See application file for complete search history.

(56) References Cited

U.S. PATENT DOCUMENTS

| | | | | |
|---|---|---|---|---|
| 8,539,408 B1* | 9/2013 | Cheng | ........... | G06F 30/367 716/110 |
| 2008/0243461 A1* | 10/2008 | Li | ........... | G06F 30/398 703/13 |
| 2009/0024347 A1* | 1/2009 | Chandra | ........... | G06F 30/367 702/130 |
| 2009/0077508 A1* | 3/2009 | Rubin | ........... | G06F 30/367 716/136 |
| 2012/0304137 A1* | 11/2012 | Pramono | ........... | G06F 30/367 716/109 |
| 2015/0370937 A1* | 12/2015 | Liu | ........... | G06F 30/367 703/14 |
| 2016/0092616 A1* | 3/2016 | Coutts | ........... | G06F 30/39 703/2 |
| 2016/0203246 A1* | 7/2016 | Chiou | ........... | G06F 30/20 716/136 |
| 2016/0328512 A1* | 11/2016 | Chen | ........... | G06F 30/398 |
| 2020/0202052 A1* | 6/2020 | Cunha | ........... | G06F 30/17 |

* cited by examiner

*Primary Examiner* — Vincent H Tran
(74) *Attorney, Agent, or Firm* — Womble Bond Dickinson (US) LLP

(57) ABSTRACT

Methods and systems are described that improve simulations which use thermal models to test dynamic thermal mitigation of devices, such as smartphones. These methods and systems can use a thermal Reduced Order Model (ROM) that is trained through machine learning to provide efficient systems that can significantly reduce the time and computational resources required to build a simulation of a device's thermal behavior. The thermal model can be used in different usage scenarios with different power management and thermal management controls to test the device's thermal behavior.

25 Claims, 10 Drawing Sheets

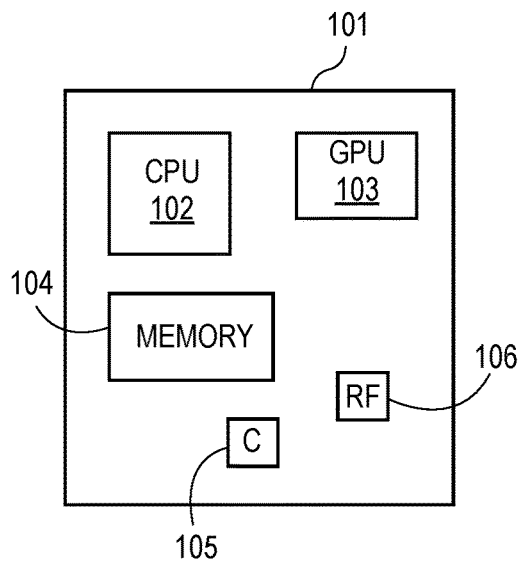
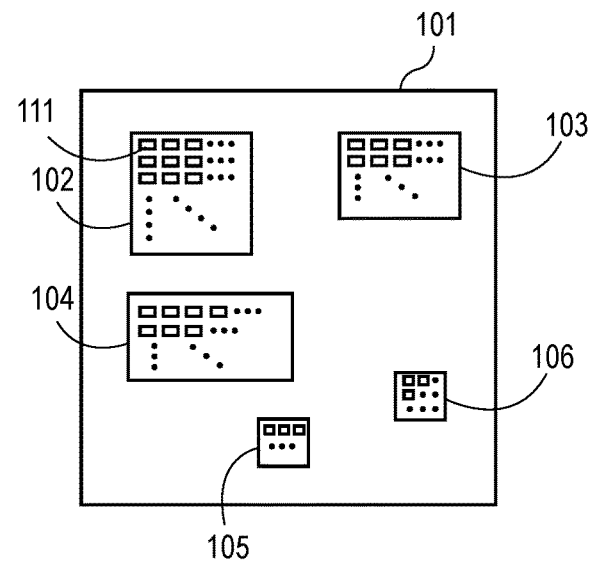
FIG. 1A  FIG. 1B
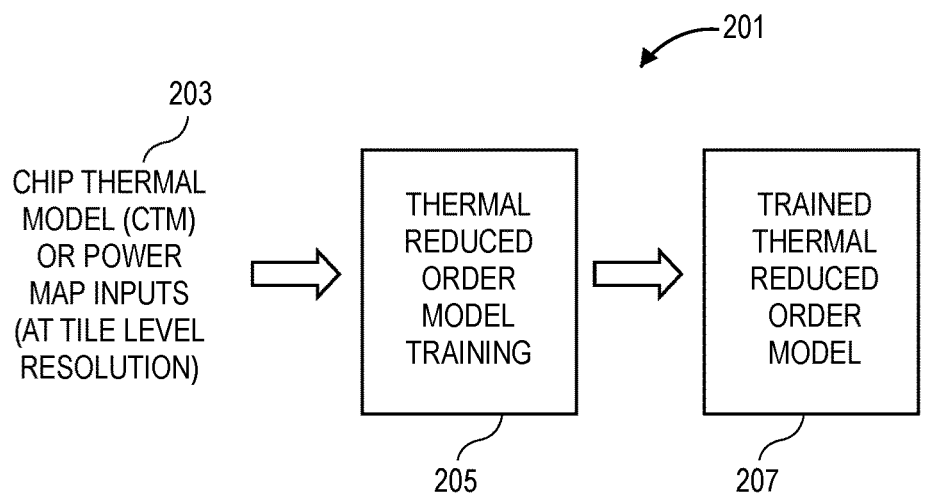
FIG. 2A
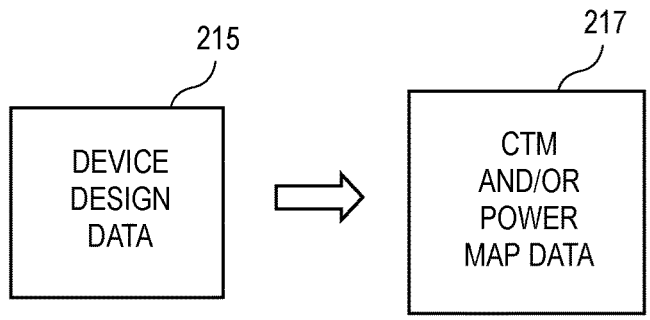
FIG. 2B

| Excited tile number | X location [mm] | Y location [mm] | $T_1^{steady}$ [°C] of 5th pilot tile | $T_2^{steady}$ [°C] of 5th pilot tile | $T_3^{steady}$ [°C] of 5th pilot tile | $\tau_1$ [s] of 5th pilot tile | $\tau_2$ [s] of 5th pilot tile | $\tau_3$ [s] of 5th pilot tile | Interpretation |
|---|---|---|---|---|---|---|---|---|---|
| 1 | 0 | 0 | 25 | 5 | 3 | 200 | 15 | 5 | Response of 5th tile when 1st tile is excited |
| 2 | 0 | 1.1 | 26 | 4 | 2 | 250 | 18 | 4 | Response of 5th tile when 2nd tile is excited |
| ... | ... | ... | ... | ... | ... | ... | ... | ... | ... |
| 100 | 10 | 10 | 24 | 6 | 2.5 | 220 | 14 | 3 | Response of 5th tile when 100th tile is excited |

$$T = A_1 e^{-\left(\frac{(x-x_0)^2}{2\sigma_{x1}^2} + \frac{(y-y_0)^2}{2\sigma_{y1}^2}\right)} + A_2 e^{-\left(\frac{(x-x_0)^2}{2\sigma_{x2}^2} + \frac{(y-y_0)^2}{2\sigma_{y2}^2}\right)}$$

STATE SPACE MODEL $$\frac{dx}{dt} = Ax + B\mu$$

$$y = Cx + D\mu$$

x = vector containing states of system
y = vector of outputs (temperature)
μ - vector of inputs (tile power)
A, B, C, and D are matrices that describe the system behavior and are constructed using thermal characteristics data

FIG. 5A

$$A = \begin{bmatrix} \frac{1}{\tau_{0\_0}} & \frac{1}{\tau_{0\_1}} & \cdots & \frac{1}{\tau_{0\_n}} \\ \frac{1}{\tau_{1\_0}} & & \cdots & \frac{1}{\tau_{1\_n}} \\ \vdots & & & \vdots \\ \frac{1}{\tau_{m\_0}} & & \cdots & \frac{1}{\tau_{m\_n}} \end{bmatrix}$$

FIG. 5B

$$B = \begin{bmatrix} \frac{1}{P_1} \\ \frac{1}{P_2} \\ \vdots \\ \frac{1}{P_m} \end{bmatrix}$$

FIG. 5C

$$C = \begin{bmatrix} \frac{T_s^{0\_0}}{\tau_{0\_0}} & \frac{T_s^{0\_1}}{\tau_{0\_1}} & \cdots & \frac{T_s^{0\_n}}{\tau_{0\_n}} \\ \frac{T_s^{1\_0}}{\tau_{1\_0}} & & \cdots & \frac{T_s^{1\_n}}{\tau_{1\_n}} \\ \vdots & & & \vdots \\ \frac{T_s^{m\_0}}{\tau_{m\_0}} & & \cdots & \frac{T_s^{m\_n}}{\tau_{m\_n}} \end{bmatrix}$$

FIG. 5D

$$D = \begin{bmatrix} 0 \\ 0 \\ \vdots \\ 0 \end{bmatrix}$$

TRANSIENT THERMAL RESPONSE OF TILE
AT LOCATION x, y:

$$T(t) = T_1^{steady} * [1 - e^{\frac{-t}{\tau_1}}] + T_2^{steady} * [1 - e^{\frac{-t}{\tau_2}}] + T_3^{steady} * [1 - e^{\frac{-t}{\tau_3}}]$$

DYNAMIC THERMAL MANAGEMENT SIMULATION USING IMPROVED REDUCED ORDER MODELING

This application claims the benefit of the priority of U.S. Provisional Patent Application No. 62/846,964, filed May 13, 2019, and this provisional application is hereby incorporated herein by reference.

BACKGROUND

Modern data processing systems, such as smartphones, laptop computers, tablet computers, etc. include many components, such as integrated circuits (ICs) and other devices that generate heat that can cause these systems to reach excessive temperatures such that users cannot use them. For example, many such systems are designed to shut down when their internal temperatures exceed certain values. Such systems can also be harmful to hold or operate when they get too hot, and the excessive heat can also damage or reduce the useful life of components (ICs, displays, sensors, etc.) in the system. Designers of these systems attempt to mitigate the effects from excessive temperatures by using techniques to reduce power consumption (e.g. by throttling voltage or frequency or both of ICs and other components) and also by designing the systems with thermal management techniques, such as fans, vents, and heat dissipating surfaces, to cool the systems. These designers may create prototypes with different thermal and power management techniques to test the prototypes to determine how well the different thermal and power management techniques operate to achieve desired levels of management of the thermal characteristics of the systems. However, the creation of prototypes for these tests is both expensive and time consuming, and thus designers often turn to simulations with software that simulate such systems without having to create a physical hardware prototype. The software known as Icepak, from ANSYS, INC. of Canonsburg, Pa., is an example of software that can perform such simulations. These simulations can take into account the physical hardware design of a system, including its heat generation sources and the cooling mechanisms (e.g., fans, vents, heat dissipating surfaces, etc.) that dissipate the generated heat. One drawback with software simulation is the computational load of accurate simulations. If the simulations seek a high level of resolution (e.g., on the order of tens of microns), then conventional simulations, even on very powerful computers, take many weeks to be built. For example, a simulation that seeks to determine temperatures over an area at a resolution of 10 by 10 microns can take over 60 days of run time to build a simulated model on a computer system that includes 500 processing cores. These excessive run times also make it difficult to test many different usage scenarios of the system over time because most of the design time is consumed by building a simulation model before even beginning to test different usage scenarios. For example, a designer of a smartphone may want to test the thermal behavior of the smartphone with different thermal and power management techniques and also with different usage scenarios. One usage scenario may include a sequence over time of watching a video (e.g. a Facetime video conference), playing audio, using navigation systems (e.g. GPS receiver, etc.) and then using a web browser over a period of less than 10 minutes; this usage scenario will result in considerable heat generation and will test how well various thermal and power management techniques work in maintaining desired temperatures. Another usage scenario can involve receiving and send emails and then taking photos and then using social media applications and then making a phone call. Thus, it is desirable to improve the current state of the art for simulating systems for the purpose of designing and testing thermal and power management of these systems.

SUMMARY OF THE DESCRIPTION

This disclosure describes methods and systems for improving simulation of dynamic thermal mitigation of devices, such as smartphones. These methods and systems can use a thermal Reduced Order Model (ROM) that is trained through machine learning to provide efficient methods and systems that can significantly reduce the time and computational resources required to build a simulation of thermal management controls of a device. These methods and systems can be used to create a thermal ROM that can be used in simulation of various scenarios of use of the device over time and in simulation of how various thermal mitigations or management techniques and power management (such as throttling of frequency and/or voltage of processing or other systems) can mitigate overheating of the devices. The thermal ROM can be created with a spatial resolution, that can be defined by tiles, of a few microns (e.g. 10 microns×10 microns) across the surface of the device, and this spatial resolution can produce improved results when simulating how a device's temperature varies over time in different use scenarios over time (e.g., using GPS to navigate, watching videos, surfing the internet, etc.).

The thermal ROM can be built using an interpolation technique (e.g. response surface fitting) that interpolates data from pilot tiles distributed evenly, in one embodiment, across the volume or surface of the device that is to be simulated. The interpolation technique is an example of a machine learning technique that can be used to train or create the thermal ROM based on a subset of portions (e.g. pilot tiles) of the device which can include multiple components dispersed over a volume of a device such as a smartphone, tablet computer, or laptop computer. Each of the pilot tiles can be used to generate thermal data (such as dynamic, time dependent temperature data) that can be extended to the rest of the tiles of the device. For example, a device such as an integrated circuit (IC) can be subdivided into a set of tiles (e.g. an IC that is 10 mm×10 mm can be subdivided into tiles, each of the tiles being 10 micron×10 micron in size), and a subset of these tiles (e.g., less than 10% or less than 1% of the tiles) can be selected to be pilot tiles that are evenly distributed over the IC (or other device such as a collection of ICs on a motherboard or other substrate). For each of the pilot tiles, simulations can be performed to obtain thermal data, such as temperature and a time constant (e.g., τ), that is derived, through the simulations, from simulated power applied, one by one, to each of the pilot tiles.

The simulations can be performed using known computational fluid dynamics (CFD) techniques, such as CFD techniques available in a computer program known as Icepak from ANSYS, INC. of Canonsburg, Pa., where the input for each simulation is a (simulated) power level for power (e.g. in watts) that is applied to one of the pilot tiles in the simulation; the CFD technique can, based on that inputted power level for one of the pilot tiles (which "excites" that pilot tile), determine thermal data (such as temperature and a time constant that indicates how quickly a steady state temperature is reached) for the pilot tile that is "excited" and for all other pilot tiles. The inputted power level can be based on the known circuitry in the tile and can be based on a worst case usage scenario for the tile (in which the tile is fully powered) and a thermal and/or power management scheme for the tile (which can be a worst case scenario in which there is no throttling of power by, for example, no reduction in operating voltage and/or operating frequency of circuitry in the tile). The CFD technique (which can be referred to as a 3D model based simulation) can, based on an excited pilot tile, derive thermal data for all pilot tiles, and the CFD technique is repeated for each pilot tile by exciting each pilot tile (in one embodiment, only one pilot tile is excited at a time while all other pilot tiles receive no power in the CFD simulation) to derive thermal data, through the simulation provided by the CFD technique, for the other pilot tiles. The simulations are performed for all pilots tiles so that, after all simulations for all pilot tiles have been completed, there is thermal data (such as a steady state temperature after a response time or time constant) for all pilot tiles when each of them is individually excited (e.g., fully powered on).

Then this thermal data can be extended to all of the non-pilot tiles through one or more interpolations or other techniques that can use machine learning to derive thermal data for non-pilot tiles when those non-pilot tiles are powered on ("excited"). In one embodiment, response surface fitting (or non-linear curve fitting) can be used to provide a form of interpolation, and the response surface fitting can be performed twice to provide thermal data for all tiles. A first response surface fitting operation can be used to derive thermal data for all tiles when any one of the pilot tiles is powered; a second response surface fitting operation can be used to derive thermal data for all tiles when any non-pilot tile is powered. In this way, the pair of response surface fittings can provide thermal data (e.g. steady state temperature and time constant to reach that steady state temperature) for all tiles when any tile (pilot or non-pilot) is powered.

This resulting set of thermal data can then be used to generate a state space model which is a form of a reduced order model. Techniques for generating a state space model from thermal data are known in the art and these techniques can be used here. See, for example the following references that describe the generation of state space models from thermal outputs from CFD simulations: Sivasubramani Krishnaswamy, et al., "Fast and Accurate Thermal Analysis of Smartphone with Dynamic Power Management using Reduced Order Model" 2017; also see: Xiao Hu, Shaohua Lin, Scott Stanton, and Wenyu Lian, "A State Space Thermal Model for HEV/EV Non-linear and Time Varying Battery Thermal Systems", Proceedings of the ASME 2011 International Mechanical Engineering Congress & Exposition, IMECE 2011-62022, Nov. 11-17, 2011, Denver, Colo. The state space model represents the thermal ROM that was trained based on the CFD simulations of the pilot tiles and based on the response surface fittings. In this case, the thermal ROM is a compact high fidelity computer generated numerical representation that preserves the essential behavior and dominant effects of a full set of CFD simulations but the thermal ROM can be built much more quickly than performing the full set of CFD simulations.

Once the state space model has been generated it can be saved and then used to test the thermal properties of a system that includes the device that has all of the tiles. Different use scenarios and different levels of power/thermal management can be quickly simulated using the thermal ROM. For example, a chip thermal model (CTM) for different use scenarios (e.g. watching video followed by using GPS to navigate followed by internet surfing, etc.) can provide power values at a per tile level over the duration of the use scenario to the thermal ROM which can then provide an output thermal map at a tile level resolution based on the set of power values for the different use scenarios. The CTM can provide power levels at the tile level for each activity (e.g. watching video or using GPS, etc.); further different levels of power/thermal management can be tested with the use scenarios. For example, during use of GPS, the power/thermal management can throttle the processing power by turning off one or more processing cores to both reduce power consumption (to preserve the battery's capacity for example) and prevent overheating of the device. Each of a set of multiple use scenarios and power/thermal management can be simulated with the thermal ROM to provide thermal/temperature maps to test if the device will overheat or produce other undesirable results.

A method in one embodiment to create a thermal model can include the following operations: defining, for use in computations that create a thermal model, a first set of tiles and a second set of tiles, the first set of tiles and the second set of tiles arranged over an area of a device; calculating, for each tile in the first set of tiles, first thermal data for all tiles in the first set of tiles based on a simulated power applied individually to each tile in the first set of tiles; calculating a first set of interpolations to produce second thermal data for all tiles in the second set of tiles based on the simulated power applied individually to each of the tiles in the first set of tiles; calculating a second set of interpolations to produce third thermal data for all tiles in the first set of tiles and the second set of tiles based on simulated power applied to each of the tiles in the second set of tiles; and generating a thermal model from at least one of the first thermal data, the second thermal data, and the third thermal data, wherein the thermal model simulates a thermal behavior of the device. In one embodiment, the thermal model can simulate the thermal behavior in response to inputs that specify usage scenarios for the device, and wherein the thermal data includes temperature data and response times for reaching a steady state temperature.

In one embodiment, the device can include at least one integrated circuit, and the first set of tiles can be evenly distributed over the area of the device. In one embodiment, the number of tiles in the first set of tiles is less than 50% of the number of tiles in the second set of tiles; in another embodiment, the number of tiles in the first set of tiles can be less than 10% of the number of tiles in the second set of tiles. In yet another embodiment, the number of tiles in the first set of tiles can be less than 1% of the number of tiles in the second set of tiles.

In one embodiment, the first set of interpolations can include a first set of response surface fittings and the second set of interpolations can include a second set of response surface fittings. In one embodiment, each of the tiles in the first set of tiles and in the second set of tiles represent a portion of the device having known circuitry and wherein at least some of the tiles are powered in a first set of usage scenarios and are not powered in a second set of usage scenarios. In one embodiment, the first set of usage scenarios are associated with one or more power maps of the device that define power levels of components in the device which in turn specify power levels of tiles within the components for the first set of usage scenarios. In one embodiment, the first set of usage scenarios are associated with one or more chip thermal models of the device that define power levels of components in the device which in turn specify power levels of tiles within the components for the first set of usage scenarios.

In one embodiment, the simulation of the thermal behavior of the device can be performed by receiving power levels, from one of a power map or a chip thermal model for a given usage scenario of the device, where the power levels which are received are used as one or more inputs to the thermal model. In one embodiment, the calculation of the first thermal data can include the use of computational fluid dynamics that is based on structural data about the device, wherein the data about the device includes data about cooling characteristics of the device and also includes data about the heat generation of components in the device. In one embodiment, the one or more inputs can include a power throttling or thermal management throttling input for a given usage scenario. In one embodiment, the thermal model is generated as a state space model.

In one embodiment, the method can also include calculating adjustments for temperatures near each tile in the first set of tiles to derive the first thermal data, wherein the adjustments account for errors due to the steep fall in temperatures near an excited pilot tile.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 1A (FIG. 1A) shows an example of a device or system that includes multiple devices such as multiple integrated circuits (ICs) on a printed circuit board (PCB). This FIG. 1A illustrates a block level resolution used in the prior art for analysis of thermal characteristics of each IC on the PCB.

FIG. 1B (FIG. 1B) shows the device of FIG. 1A with a resolution of tiles instead of blocks as in FIG. 1A, where the tiles represent portions of the block and each tile can be a small fraction of the block.

FIG. 2A (FIG. 2A) illustrates an example according to one embodiment in which a thermal Reduced Order Model (ROM) can be created.

FIG. 2B (FIG. 2B) shows an example of how device design data can be used to derive power map data or chip thermal model (CTM) data that can be used in one or more embodiments describe herein.

FIG. 5A (FIG. 5A) shows an example of a state space model that can be used to create a thermal ROM based on the thermal training data obtained from an embodiment of the method shown in FIG. 3A.

FIG. 5B (FIG. 5B) illustrates an example of the matrix A in the state space model of FIG. 5A.

FIG. 5C (FIG. 5C) illustrates an example of the matrix B in the state space model of FIG. 5A.

FIG. 5D (FIG. 5D) illustrates an example of the matrix C in the state space model of FIG. 5A.

DETAILED DESCRIPTION

Figure 3A:
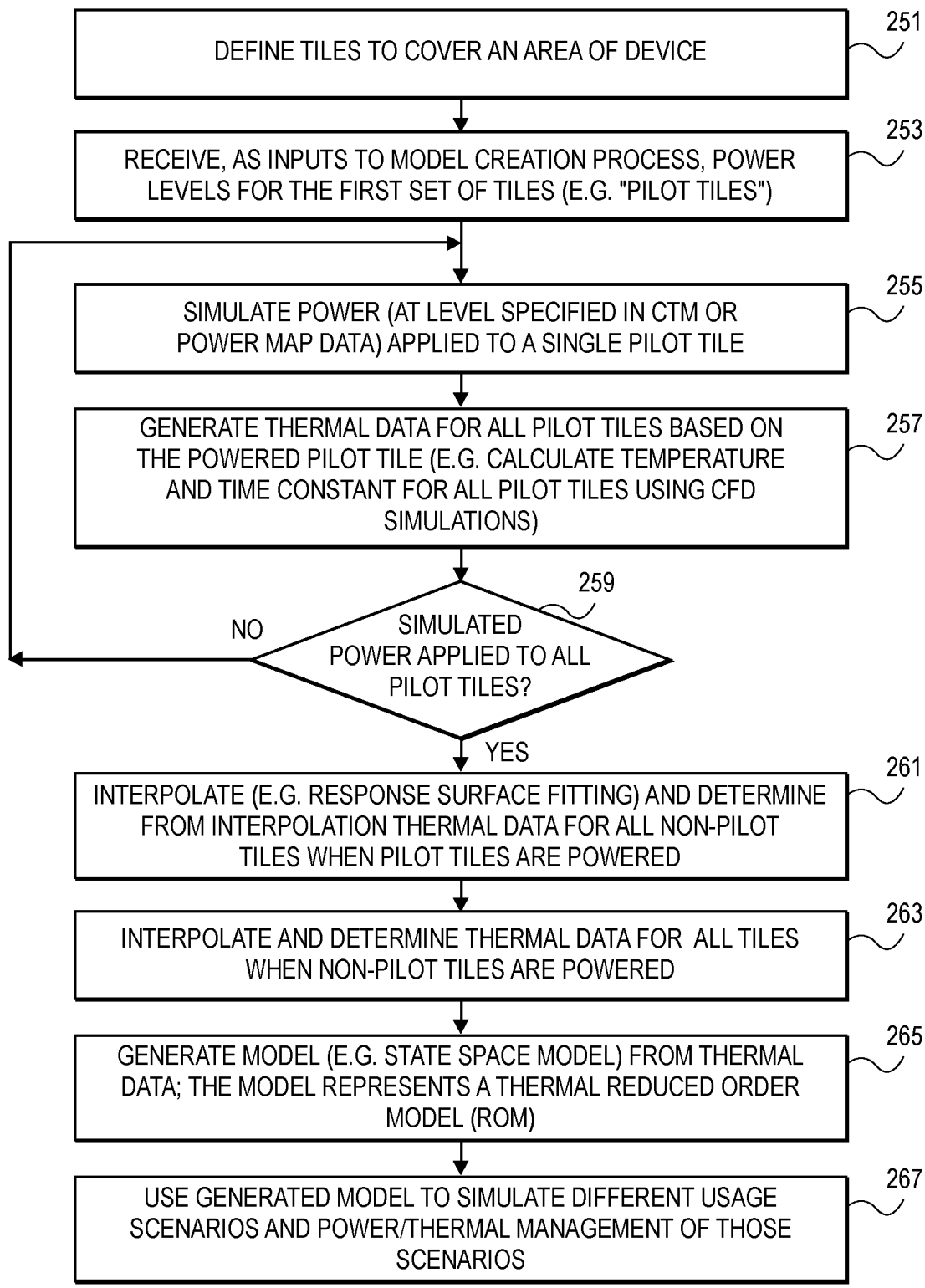
FIG. 3A (FIG. 3A) is a flowchart that presents a method according to one embodiment for training and using a thermal ROM.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Dynamic thermal management of modern data processing systems typically uses a set of power throttling methods and can also use active and/or passive cooling methods. These methods are often developed and then tested on such systems. The testing can be done either using actual hardware or can be done in simulations in software based on simulated hardware. The embodiments described herein can use simulations to perform this testing after a thermal reduced order model (ROM) is created as described herein.

FIG. 1A shows an example of a device 101 which is a system that includes a plurality of integrated circuits and other devices that are coupled together to create a data processing system such as a smart phone or laptop computer or a tablet computer, etc. The device 101 includes a central processing unit (CPU) 102, a graphics processing unit (GPU) 103, memory 104, radiofrequency components such as RF component 106 which can be one or more integrated circuits for cellular telephone communication or Wi-Fi communication or Bluetooth communication or combination of such communication systems. The camera device 105 can include one or more integrated circuits along with other components for the camera; in one embodiment, the device 101 can include a plurality of cameras including a front facing camera and a back facing camera. The memory 104 can include multiple integrated circuits which include DRAM memory and flash memory in one embodiment. The device 101 can be in a small compact form factor with no fan which tends to increase problems associated with thermal management due to the compact size. Methods in the prior art for performing simulations of a system such as the device 101 shown in FIG. 1 perform the simulations at a block level such that the power of the CPU 102 and the power of the GPU 103 are used to calculate thermal data for each of the CPU 102 and the GPU 103 without regard to variations in power over the area of each integrated circuit. The block level simulation is a course level simulation due to the size of these ICs for the CPU 102 and the IC for the GPU 103. Such integrated circuits are each often many millimeters along a side; for example an integrated circuit is often 10 mm×10 mm in size.

The embodiments described herein utilize a representation of a portion of an integrated circuit or other device for use in computations that create a thermal model; this portion can be referred to as a tile. In one embodiment, a large number of tiles can be arranged to cover an entire area of a device, such as an integrated circuit or a printed circuit board which includes a plurality of integrated circuits. For example, an integrated circuit that is a square that measures 10 mm×10 mm in size can be defined as having over 62,500 tiles, each having a size of 40 µm×40 µm. FIG. 1B shows an example of how tiles can be defined in an arrangement to cover the entire area of a device such as each integrated circuit in the device 101 as shown in FIG. 1B. For example, tiles, such as tile 111, are arranged to cover the entire surface of each integrated circuit at a high resolution in one embodiment. For example, each tile can be set at a size of 40×40 µm. Each of the integrated circuits, such as the CPU 102 and the GPU 103 include such tiles which are used in the calculations that create a thermal model as described further below.

FIG. 2A shows a process according to one embodiment which uses input data to train a thermal ROM which can then be used, once trained, to perform dynamic thermal management simulations, such as the simulations which are described below in conjunction with FIG. 7. A chip thermal model (CTM) or power map can be used as inputs 203 in the training process 205 which can be performed using operations 251 through 263 shown in FIG. 3A. The training produces a trained thermal ROM 207 which in one embodiment can be the result of operation 265 shown in FIG. 3A. The inputs 203 from a CTM or power map can be based upon the actual design of the device, such as the actual design of the integrated circuit. In other words, the actual circuitry within each of the tiles can be taken into account in different usage scenarios when determining whether or not a particular tile will be receiving power and how much power is consumed in a particular usage scenario. For example, tiles that contain circuitry for performing video codec operations may not be powered in certain usage scenarios while in other usage scenarios that circuitry will be powered; for example, video codec operations are typically required to decode video and thus such codec circuitry would be receiving power when video is being received and decoded. A usage scenario which uses of the device to receive and display video will cause the circuitry in the codec portion of the device to receive power; in another usage scenario, the codec circuitry may not receive power and thus will not be generating heat. The relationship between each of the tiles in an area of the device, such as an integrated circuit, is specified by the device design data 215 shown in FIG. 2B. In one embodiment, the device design data 215 can be a computer file that specifies the circuitry which is fabricated within each tile on the device, and this in turn can be used to create a chip thermal model or power map 217 which in turn can be an input in the training process as well as an input to the trained thermal ROM after the ROM has been trained.

Figure 3B:
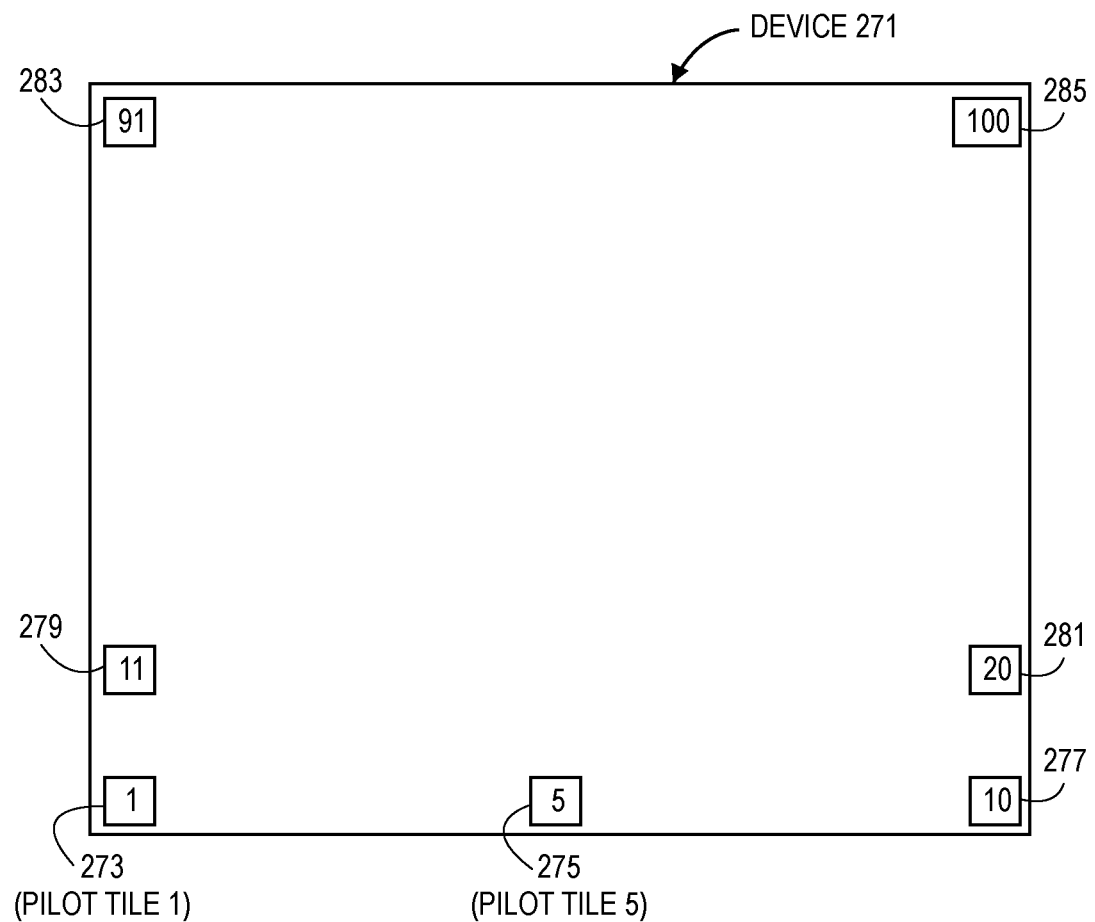
FIG. 3B (FIG. 3B) shows a device, such as an integrated circuit, and shows pilot tiles that have been defined relative to the surface area of the device. In this example, the pilot tiles are evenly distributed over the surface of the device.

FIG. 3A shows an example of a method which can be used to train and generate a thermal ROM which can then be used to simulate different usage scenarios and different power and thermal management techniques for those scenarios. The method shown in FIG. 3A can begin in operation 251 in which tiles are defined to cover an area of a device. In one embodiment, the device can be a single integrated circuit. In another embodiment, the device can be a plurality of integrated circuits each with their own tiles, and the integrated circuits are assembled on a substrate such as a printed circuit board. In one embodiment, the tiles are portions of the area of the device and are arranged to cover the entire area of the device with contiguous tiles arranged over the entire surface area of the device. FIG. 3B shows a device which can be an integrated circuit. In particular, the device 271 has a surface area which is covered by many tiles. In one embodiment, there can be over 10,000 tiles arranged to cover the entire surface of the device 271. In one embodiment, the tiles can each be squares of a size of 40×40 µm. In one embodiment, the method of FIG. 3A uses two sets of tiles. A first set of tiles can be referred to as pilot tiles which can be evenly distributed across the area of the device. This is shown in FIG. 3B. In particular, only pilot tiles are shown in FIG. 3B. In this example, there are 100 pilot tiles arranged evenly over the surface of the device 271 which can be an integrated circuit. FIG. 3B shows seven pilot tiles labeled as pilot tiles 273, 275, 277, 279, 281, 283, and 285. It will be appreciated that the remaining pilot tiles are evenly distributed over the area of the device 271 even though they are not shown in FIG. 3B. The second set of tiles are the rest of the tiles distributed over the surface of the device 271. In one embodiment, the combination of the first set of tiles and the second set of tiles cover the entire surface of the device 271. If the device has an area defined by a square which is 10 mm×10 mm, then there can be about 62500 tiles of which 100 tiles are pilot tiles (the first set of tiles) and the remaining 62400 tiles are the second set of tiles which are not pilot tiles. Referring back to FIG. 3A, in operation 253, inputs are provided to a model creation process, where these inputs include power levels for each of the pilot tiles in the first set of tiles. In one embodiment, these power levels can be based upon the actual circuitry within each pilot tile; for example, circuit data (such as device design data 215) may specify the actual circuitry within the particular tile and this circuitry (and how it is operated in terms of applied voltage and frequency and other parameters) can specify the power consumed by the circuitry when it is operational. In this embodiment, the power levels can accurately reflect the actual power consumed in each tile, and this can be used in the simulations described herein which can begin in operation 255. In another embodiment, these power levels can be specified at a constant power based on data from the CTM or power map data without taking into account the actual circuitry or any operating parameters.

In operation 255, simulated power can be applied to a single pilot tile, where in one embodiment each pilot tile is powered while all other pilot tiles do not receive simulated power. In one embodiment, the simulated power is applied at the level specified in the CTM or power map data for the particular tile which is being powered in operation 255. In one embodiment, the simulation of the application of power to a particular pilot tile can be used to calculate a thermal response (such as, e.g., temperature and steady-state temperature response times) for all pilot tiles in response to the application of simulated power to the particular pilot tile using, for example, computational fluid dynamics techniques known in the art. For example, as shown in operation 257, thermal data (for example, temperatures and time constant values) for all pilot tiles can be calculated using computational fluid dynamics based on the single pilot tile which receives simulated power. The computational fluid dynamics computations can be performed in one embodiment by the software package known as Icepak from ANSYS, Inc. of Canonsburg, Pa. These computations can use structural and thermal information about the device and the system containing the device in order to compute temperatures and time constant values based upon the simulated power applied to a particular pilot tile.

Figures 3C, 3D:
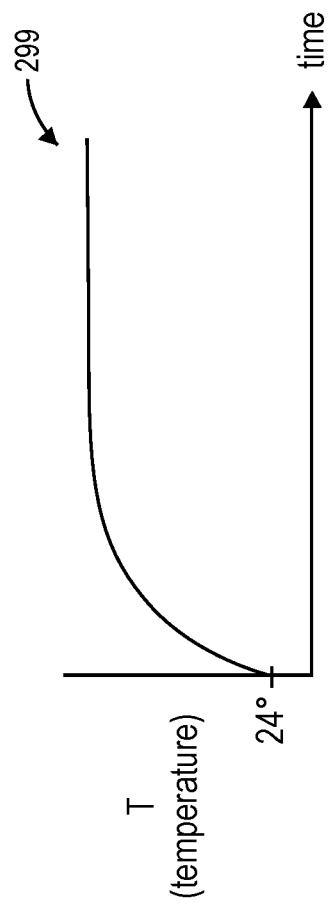
FIG. 3C (FIG. 3C) is a table that illustrates the data collected during the simulated excitation of all pilot tiles and the resulting thermal behavior at the 5th pilot tile according one embodiment.
FIG. 3D (FIG. 3D) is a graph of temperature versus time and depicts the rising temperature of a tile as a result of the excitation of the tile or another tile.

FIG. 3D shows an example of a graph of temperature versus time of the thermal data obtained for a particular pilot tile; in particular, the graph shown in FIG. 3D shows the steady-state temperature after a period of time. The transient thermal response curve 299 in FIG. 3D indicates that after a period of time the temperature reaches a steady-state value (which in this example exceeds 24 degrees Celsius). The time period required for it to reach the steady-state temperature is indicated by one or more time constants which is explained further below. FIG. 6 shows the mathematical representation of the transient thermal response given in FIG. 3D. The six constants $T_1^{steady}$, $T_2^{steady}$, $T_3^{steady}$ and $\tau_1$, $\tau_2$, $\tau_3$ are determined, in one embodiment, using a non-linear optimization algorithm.

FIG. 3C shows an example of thermal data which has been generated through simulations based upon computational fluid dynamic computations; FIG. 3C shows the thermal data for the fifth pilot tile when all pilot tiles are individually (one by one) powered as in the method shown in FIG. 3A. In one embodiment, operation 257 generates the thermal data, such as thermal data 291 shown in FIG. 3C for the fifth pilot tile (after iterating through all pilot tiles), for all pilot tiles based upon the sole pilot tile that received simulated power. Thus if the device has 100 pilot tiles then after iterating 100 times through operation 257, each pilot tile will have thermal data like thermal data 291 and this thermal data can be used to compute a response surface for each pilot tile.

FIG. 3C shows an example of thermal data that can be generated by operation 257 and also by operation 261. The thermal data 291 is for the fifth pilot tile and has the thermal data generated from 100 simulations in operation 257 for 100 pilot tiles (numbered 1 through 100); each of these pilot tiles has an x and y location shown in the second and third columns of FIG. 3C. Each row in thermal data 291 is for one of the excited pilot tiles and shows the simulated temperature (in degrees Celsius in the fourth column of FIG. 3C) at the fifth pilot tile and the time constant data $\tau_1$, $\tau_2$, and $\tau_3$ (in seconds) at the fifth pilot tile. The first row in FIG. 3C shows the response of the $5^{th}$ tile when simulated power is applied to the first tile; similarly, the second row in FIG. 3C shows the response of the $5^{th}$ tile when simulated power is applied to the second tile, and so on through to tile 100 in the last row of FIG. 3C. The thermal data 291 can be used to create a response surface or pilot surface for the $5^{th}$ pilot tile. In general, thermal data for each pilot tile can be used to create a response surface for the pilot tile.

Referring back to FIG. 3A, the method continues in operation 259; in operation 259, the method determines whether simulated power has been applied to all pilot tiles. In the example shown in FIG. 3B, operations 255 and 257 will be repeated 100 times for each of the pilot tiles, and operation 259 determines whether the simulations and generation of thermal data have been completed for all pilot tiles. If more pilot tiles remain to be processed, then operation 259 causes the method to revert back to operation 255 for the next pilot tile to be processed by simulating the application of power to that next pilot tile which in turn causes the generation of thermal data for all pilot tiles based on the next pilot tile to which simulated power is applied. If operation 259 determines that simulated power has been applied to all pilot tiles (and thus response surfaces can be generated for each pilot tile), then processing proceeds to operation 261.

Figure 3E:
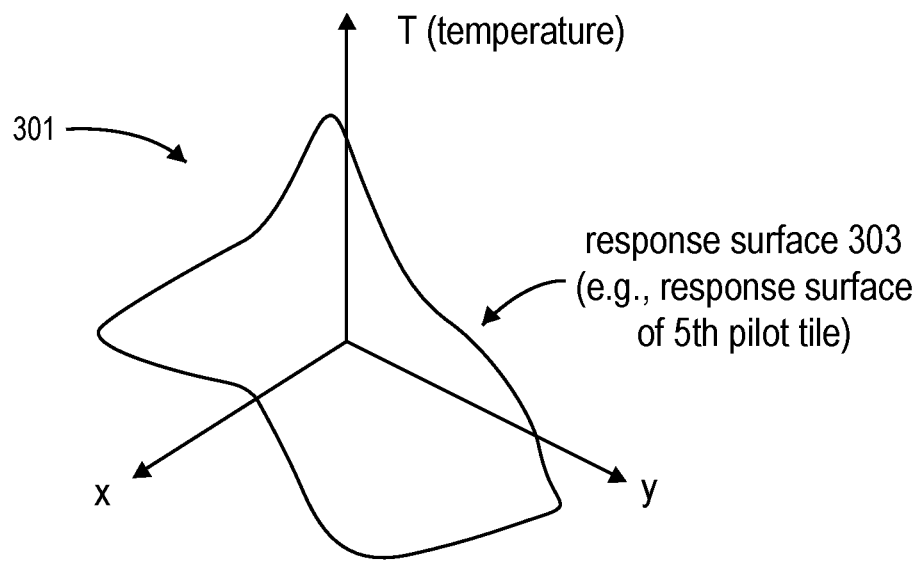
FIG. 3E (FIG. 3E) shows a graph which illustrates a response surface for a particular pilot tile according to one embodiment.

In operation 261, the method can determine, from for example interpolations, thermal data for all-pilot tiles when the non-pilot tiles are individually (one by one) powered. In one embodiment, each of the interpolations can be a response surface fitting which uses curve fitting to a surface defined by temperature values obtained from operation 257. In one embodiment, response surface fittings can be performed in operation 261 on the thermal data of each pilot tile with respect to other pilot tiles to obtain extended thermal data of each pilot tile with respect to non-pilot tiles of the device. FIG. 3E shows an example of a response surface which can be used in the interpolation operation of operation 261 to determine thermal data for all pilot tiles when each of the non-pilot tiles are powered according to thermal data for all pilot tiles when each of the pilot tiles are powered. In particular, FIG. 3E shows an example of a graph 301 of temperature relative to X and Y locations (e.g. the temperature contour when a tile positioned at X and Y locations is powered); these X and Y locations can be the same X and Y locations shown in FIG. 3C. In one embodiment, operation 261 can use the X and Y locations of each—pilot tile to determine thermal data of the non-pilot tile from the response surface, such as response surface 303 in FIG. 3E, of the pilot tile. Each pilot tile in one embodiment will have a response surface that can be derived from the thermal data generated for that pilot tile, and FIG. 3C shows an example of that thermal data (thermal data 291) for the $5^{th}$ pilot tile; the response surface for a particular pilot tile can be referred to as a pilot surface (so the response surface of the first pilot tile can be referred to as "pilot surface 1" and the response surface of the $2^{nd}$ pilot tile can be referred to as "pilot surface 2" etc.). The thermal data 291 can be used to determine the pilot surface of the $5^{th}$ pilot tile in one embodiment and this pilot surface may resemble the response surface 303 shown in FIG. 3E. In an embodiment that uses 100 pilot tiles, there will be 100 pilot surfaces, and each of these can be used to calculate, from interpolations in operation 261, the thermal data for each of the -pilot tiles when any of the non-pilot tiles are powered (via the application of simulated power in operation 255). This set of interpolations (in operation 261) can, in one embodiment, rely on the physical proximity of a non-pilot tile to a nearest pilot tile (or set of 4 nearest pilot tiles) to determine thermal data as a result of powering that non-pilot tile from the thermal data as a result of powering the nearest pilot tile (or set of nearest pilot tiles) via simulated power. This physical proximity is represented by the pilot surfaces in one embodiment. In one embodiment, the set of interpolations in operation 261 can produce thermal data like thermal data 291 for exciting each non-pilot tile based upon thermal data when each of the pilot tiles having been excited (by the application of simulated power in operation 255).

After operation 261 has been performed, operation 263 can be performed to obtain thermal data for all non-pilot tiles when any one of the tiles are powered. In one embodiment, operation 263 can use interpolations (e.g., response surface fittings) to determine thermal data for non-pilot tiles when any one of the tiles is powered based on thermal data for the pilot tiles when the one tile is powered. For example, the thermal data for the pilot tiles when the one tile is powered can be obtained by using pilot surfaces for the pilot tiles. Operation 263 can rely on the physical proximity of each of the non-pilot tiles to nearest pilot tiles to infer thermal and power characteristics of the non-pilot tiles from the nearest pilot tiles. A detailed example, described below, shows how operation 263 can obtain this thermal data for non-pilot tiles given a location of a tile. In one embodiment, operation 263 can use a single query surface to determine thermal data for each non-pilot tile for any tile located according to a given x and y location. In one embodiment, response surface fittings can be performed in operation 263 on the thermal data of each pilot tile with respect to other tiles (pilot or non-pilot tiles) to obtain extended thermal data of each tile with respect to all tiles of the device.

After operation 263, a model can be generated in operation 265, and this model in one embodiment can be a thermal reduced order model (thermal ROM) that is represented by a state space model which is a type of model that is known in the art. Further details about an embodiment of a state space model that can be used as part of the method in FIG. 3A is provided below in conjunction with FIGS. 5A-5E. Once a model, such as a state space model, is generated, it can be used in simulations of the device to see how the device reacts under different usage scenarios and with different power and thermal management algorithms. For example, in operation 267, a state space model can be used in simulations with such usage scenarios and with different power and thermal management algorithms to determine whether the power and thermal management algorithms successfully mitigate excessive thermal problems. Further information about these simulations that use a completed (built) thermal ROM is provided below in conjunction with FIG. 7.

Figure 3F:
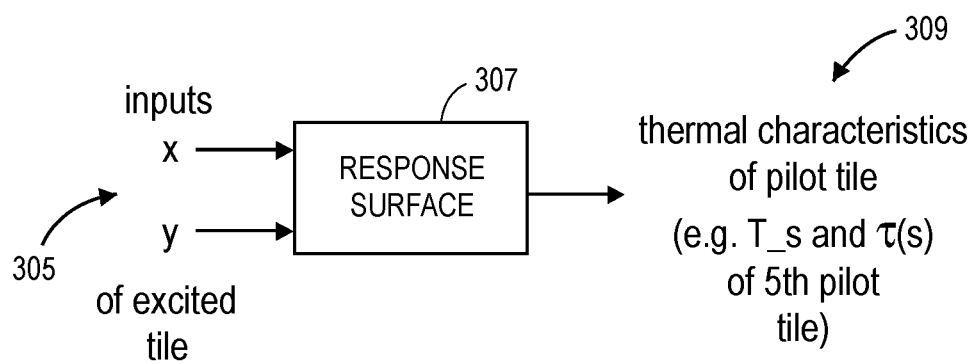
FIG. 3F (FIG. 3F) shows an example of how the location of an excited tile can be mapped through a response surface to the thermal characteristics of other pilot tiles.
Figure 3G:
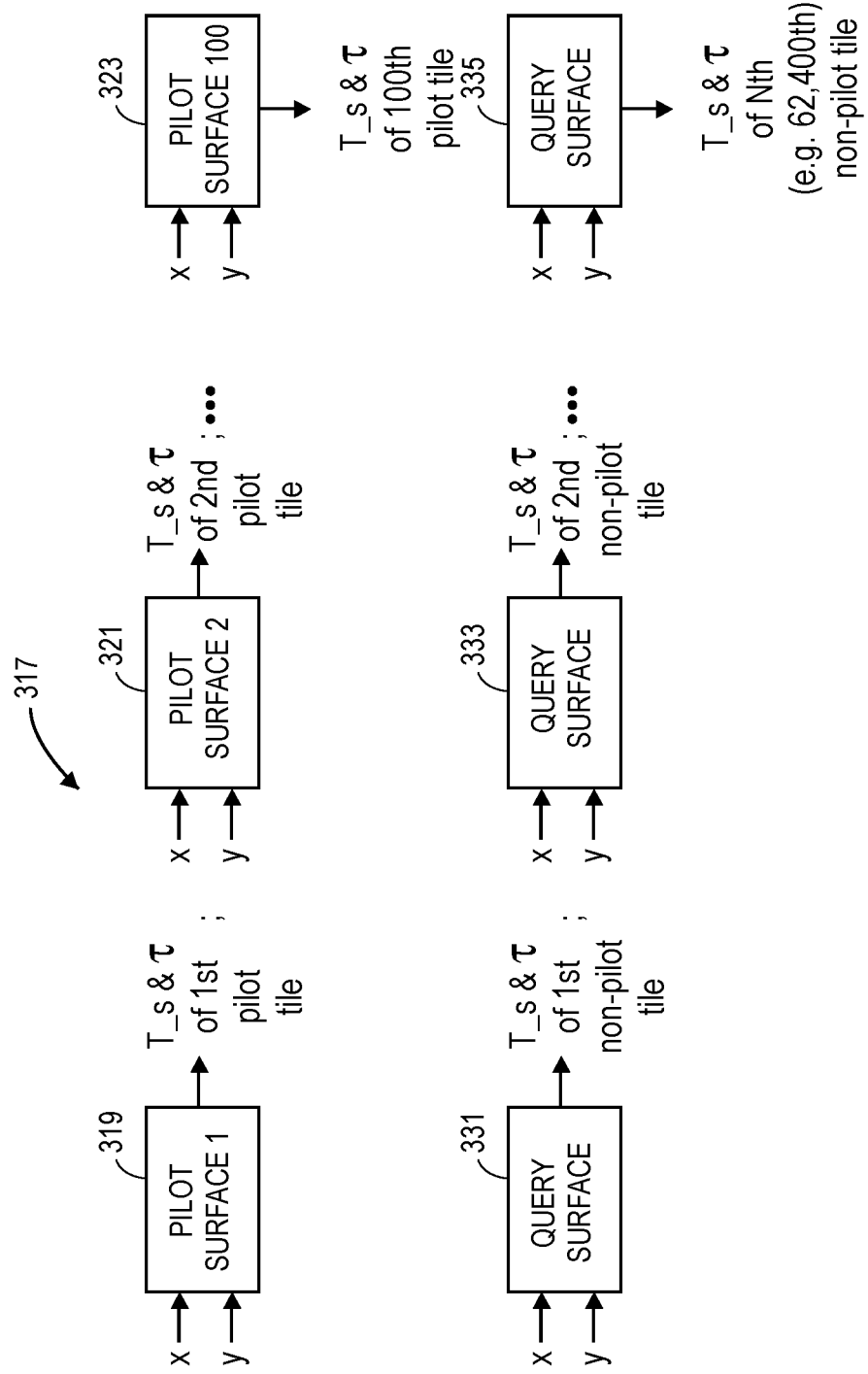
FIG. 3G (FIG. 3G) shows an example of how the pilot surfaces and a single query surface can be used to generate thermal data for all tiles on the device.

FIGS. 3F and 3G show examples of how the response surfaces are used in one embodiment to create thermal data for all tiles and this thermal data can be used to create a thermal model. FIG. 3F shows how a response surface 307 can be used to provide the thermal data based on the x and y location inputs 305 of the location of an excited tile. The output 309 from the response surface 307 can be based on the thermal data from the simulations (such as simulations in operation 257) and/or the interpolation of the simulated thermal data; the output can be derived directly from the location input of the excited tile by using the response surface 307. This can be seen from the response surface 303 in FIG. 3E where a temperature value (along the z axis) can be determined from an x and y location coordinate. FIG. 3G shows how the thermal data from the pilot tiles can be extended to all tiles in a sequence of operations 317. The pilot surfaces 319, 321, and 323 can be determined from 100 iterations of operations 255 and 257 (in FIG. 3A), for example, based on interpolation/surface fitting. These pilot surfaces can then be used to create a single query surface or a set of query surfaces (such as query surfaces 331, 333, and 335), for example, based on interpolation/surface fitting using thermal data obtained from pilot surfaces, which can map or transform a given location input (a pair of x and y coordinates) to thermal data based on the location of the excited tile.

Figures 4A, 4B:
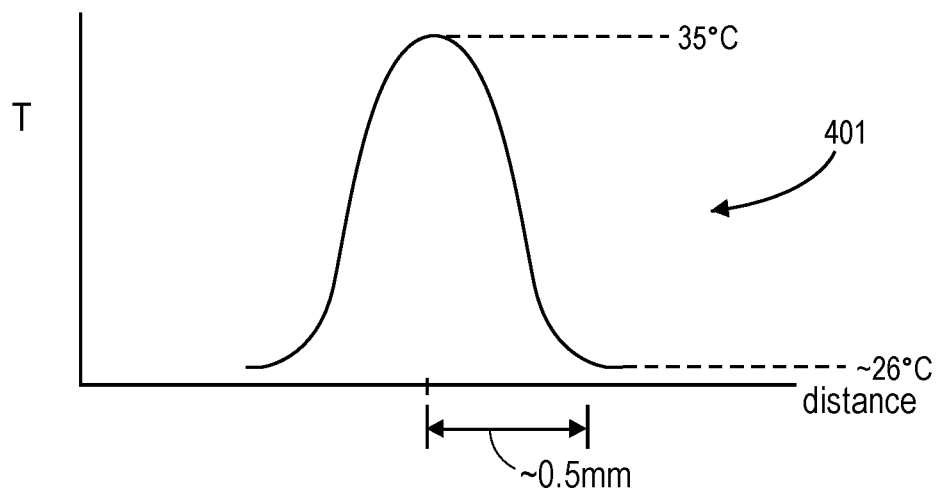
FIG. 4A (FIG. 4A) shows how a temperature at a particular tile can vary as a function of distance from the center of the tile being excited.
FIG. 4B (FIG. 4B) shows an example of a mathematical expression that may be used to correct for the local errors in temperature near an excited pilot tile.

FIGS. 4A and 4B show an embodiment which compensates for errors due to the coarse spatial nature of the evenly distributed pilot tiles. When any tile is excited, the temperature near the excited pilot tile is high but falls steeply as a function of distance, and this is shown in FIG. 4A. In the example of FIG. 4A, the temperature falls, as shown by temperature map 401, to nearly ambient temperature in just 0.5 mm away from the center of the excited tile. FIG. 4B shows an example of a near source correction in which a steady state temperature map can be represented by a bivariate second order Gaussian distribution shown in FIG. 4B. In one embodiment, the pilot tile CFD simulations (e.g., in operation 257) are exported to profiles near the pilot tiles. The equation used in 4B is a second order bivariate gaussian surface whose parameters are mean (X0 and Y0), standard deviations ($\sigma_{x1}$, $\sigma_{x2}$, $\sigma_{y1}$, $\sigma_{y2}$) and amplitude (A1 and A2). The parameters of this equation are determined for all the pilot tiles using non-linear optimization techniques. This equation is used to determine the steady state temperature field in the vicinity of the excited tile while performing step 263 in FIG. 3A.

The thermal characteristics of all the tiles can then be re-arranged to express the information in a state space matrices form. These matrices are collectively called as Tile level thermal Reduced Order Model (or Tile level ROM in short).

Figures 5E, 6, 7:
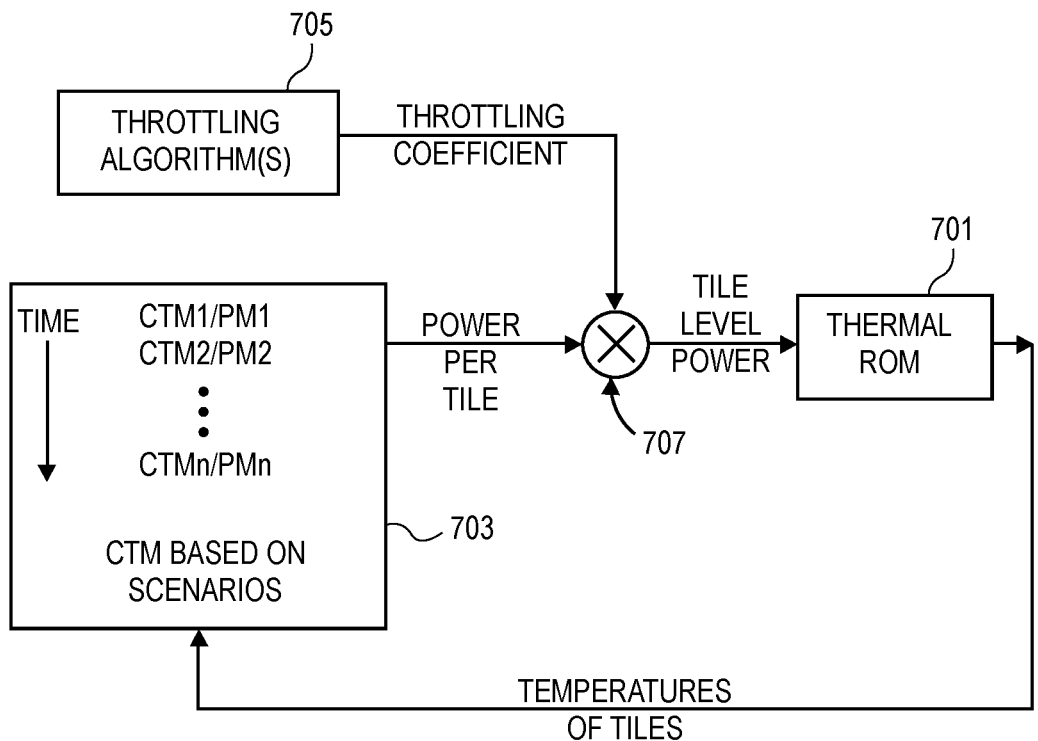
FIG. 5E (FIG. 5E) illustrates an example of the matrix D in the state space model of FIG. 5A.
FIG. 6 (FIG. 6) provides an example of a mathematical expression that may be used to represent a temperature curve that can provide a transient thermal response of any tile at a given location on a device such as an IC or PCB containing a set of ICs.
FIG. 7 (FIG. 7) is a block diagram that shows the use of a thermal ROM, once built, in simulations of a device using one or more usage scenarios of the device over time, and these simulations can use different throttling algorithms or techniques over time.

As noted above, a state space model can be used to implement a trained thermal ROM such as the thermal ROM 701 in FIG. 7. A state space model can be generated in operation 265 of FIG. 3A and then used in dynamic simulations of the device. FIGS. 5A, 5B, 5C, and 5D show details of a state space model that can be used in one embodiment. The model can use 4 matrices (derived from the training thermal data obtained from operations 257, 261 and 263 in FIG. 3A) and use the inputs of tile power levels to produce an output of the temperatures of each of the tiles based on the inputs. X is a vector containing states of the system as is known in the art of state space models. Y is a vector of outputs (temperatures of each of the tiles). U is a vector of inputs which can be the simulated power of each of the tiles. The matrix A contains the time constants of the device (e.g., time constants in FIG. 3C). The matrix B contains the input power for each of the tiles. The matrix C contains the steady state response information derived from operations 257, 261 and 263. The matrix D relates to the device's responsiveness. In one embodiment, for these thermal simulations, D is a null vector since the device has a non-zero thermal inertia.

Once a thermal model has been created for a device (such as an IC or set of ICs on a PCB), then the thermal behavior of the device can be simulated over time with different usage scenarios. The usage scenarios map to power levels for all of the tiles based on design data about the device as explained above. Power map data or CTM data can provide these power levels for the different usage scenarios, and these power levels, as modulated by one or more throttling coefficients, can be inputted into the thermal model that can then provide temperature outputs. These outputs can be fed back into the CTM or power map algorithms to derive new power levels; the feedback loop takes into account the known behavior of hotter devices using more power as a result of the increased temperature of the device. FIG. 7 shows an example of a simulation system that uses a thermal model, such as the thermal ROM 701, that can be generated using the method of FIG. 3A. The thermal ROM 701 can be implemented in the form of a state space model that can quickly provide temperature outputs at tile level resolution (e.g., tiles of about 10 microns by 10 microns in one embodiment) in response to power level inputs for all tiles. CTM data 703 (or power map data) can provide the power level inputs for all of the tiles as described above. For example, one usage scenario can include the use of a camera and GPS receiver, and the tiles that contain circuitry for the camera and the GPS receive would receive power in this usage scenario while other tiles not requiring power in this usage scenario may not receive power. Thus, a CTM or power map output based on this usage scenario can be provided as an input to the thermal ROM 701. In addition, the output from the CTM data 703 can be reduced by modulator 707 which is controlled by throttling algorithms 705 that seek to reduce overheating and seek to extend battery life by reducing power consumption. The resulting power levels for all tiles (after reduction if any by modulator 707) can be applied as inputs to the thermal ROM which can provide the temperature outputs for all tiles very quickly. The process can be repeated multiple times with the same usage scenarios and different throttling coefficients to see if it is possible to maintain desired thermal behavior (e.g., no excessive overheating) and also obtain adequate system performance. Moreover, different usage scenarios can also be applied. Further, multiple usage scenarios in a continuous sequence over time can be simulated with different throttling levels (specified by different throttling coefficients). Thus, the simulation system shown in FIG. 7 can provide rapid simulations at high resolution for the device over a wide variety of scenarios and throttling levels. The ability to do rapid simulations using the thermal ROM allows designers to do many simulations, testing different throttling levels and usage scenarios over time.

Figure 8:
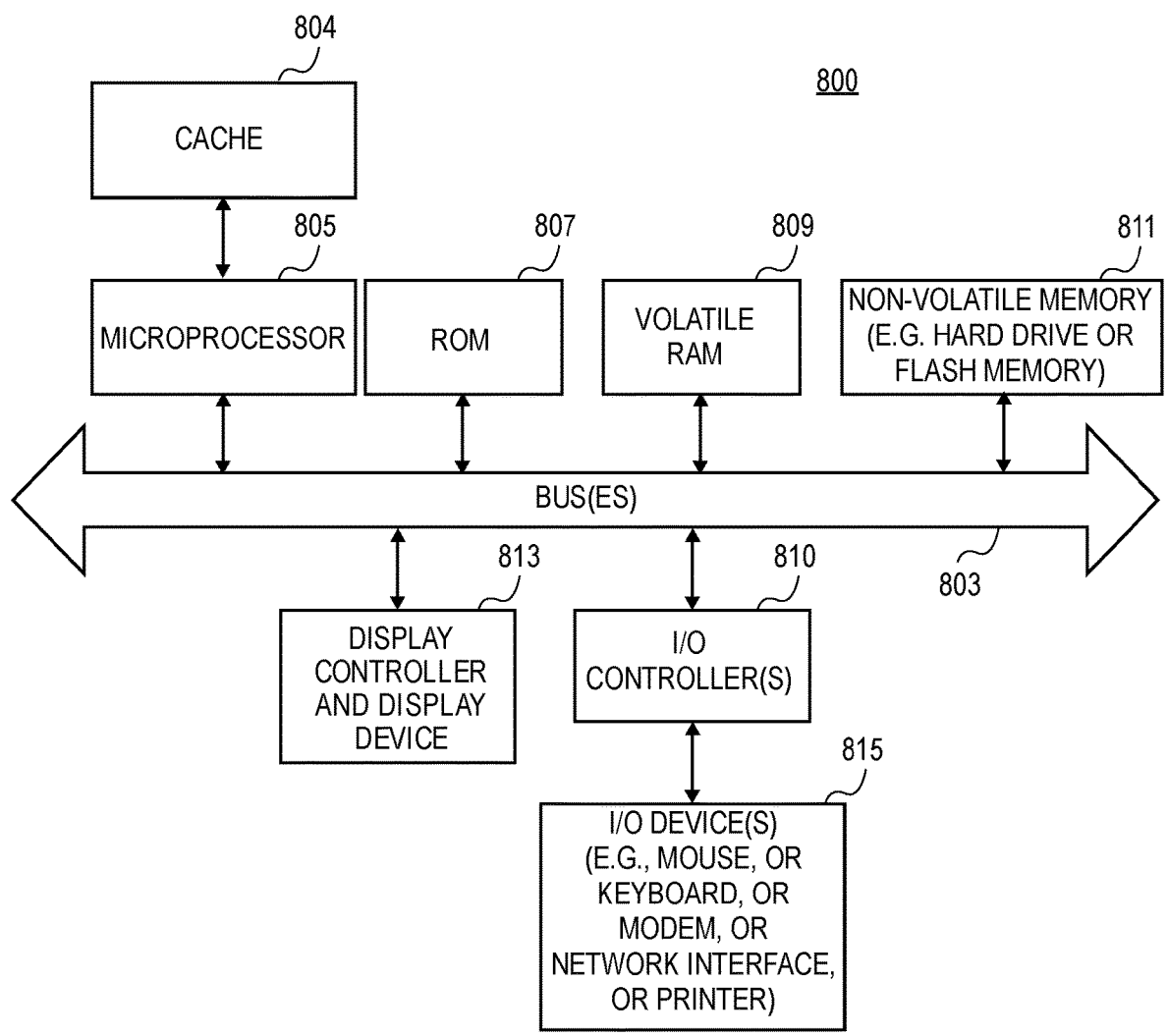
FIG. 8 is a block diagram of a data processing system that can be used to perform or implement one or more embodiments described in this disclosure.

FIG. 8 shows one example of a data processing system 800, which may be used with one embodiment. For example, the system 800 may be implemented to provide a system 101 as shown in FIG. 1 or a simulation tool 207 shown in FIG. 2. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

The invention claimed is:

1. A non-transitory machine readable medium storing executable program instructions which when executed by a data processing system cause the data processing system to perform a method, the method comprising:
defining, for use in computations that create a model, a first set of tiles and a second set of tiles, the first set of tiles and the second set of tiles arranged over an area of a device;
calculating, for each tile in the first set of tiles, first thermal data for all tiles in the first set of tiles in response to each tile in the first set of tiles being individually excited based on a simulated power applied individually to each tile in the first set of tiles;
calculating a first set of interpolations based on the first thermal data to produce second thermal data for all tiles in the first set of tiles responding to each tile in the second set of tiles being individually excited;
calculating a second set of interpolations based on the second thermal data to produce third thermal data for all tiles in the second set of tiles responding to each tile in the first set of tiles and the second set of tiles being individually excited;
generating a thermal model from at least one of the first thermal data, the second thermal data, and the third thermal data, wherein the thermal model simulates a thermal behavior of the device.

2. The medium as in claim 1 wherein the thermal model simulates the thermal behavior in response to inputs that specify usage scenarios for the device and wherein the thermal data includes temperature data and response times for reaching a steady state temperature.

3. The medium as in claim 1 wherein the device comprises at least one integrated circuit and wherein the first set of tiles are evenly distributed over the area of the device and wherein the number of tiles in the first set of tiles is less than 50% of the number of tiles in the second set of tiles.

4. The medium as in claim 1 wherein the first set of interpolations comprises a first set of response surface fittings and the second set of interpolations comprises a second set of response surface fittings and wherein each of the tiles in the first set of tiles and in second set of tiles represents a portion of the device having known circuitry and wherein at least some of the tiles are powered in a first set of usage scenarios and are not powered in a second set of usage scenarios.

5. The medium as in claim 4 wherein the first set of usage scenarios are associated with one or more power maps of the device that define power levels of components in the device which in turn specify power levels of tiles within the components.

6. The medium as in claim 4 wherein the first set of usage scenarios are associated with one or more chip thermal models of the device that define power levels of components in the device which in turn specify power levels of tiles within the components.

7. The medium as in claim 1 wherein the method further comprises:
    simulating the thermal behavior of the device by receiving power levels, from one of a power map or a chip thermal model for a given usage scenario of the device, as one or more inputs to the thermal model.

8. The medium as in claim 1 wherein the calculating of the first thermal data comprises computational fluid dynamics based on a structural data about the device that includes data about cooling characteristics of the device.

9. The medium as in claim 7 wherein the one or more inputs comprise a power throttling or thermal management throttling for the given usage scenario.

10. The medium as in claim 9 wherein the thermal model is generated as a state space model.

11. The medium as in claim 10 wherein the method further comprises:
    adjusting at least one of the power or thermal management throttling and then simulating again the thermal behavior of the device.

12. The medium as in claim 1 wherein the method further comprises:
    calculating adjustments for temperatures near each tile in the first of tiles to derive the first thermal data.

13. A method comprising:
    defining, for use in computations that create a model, a first set of tiles and a second set of tiles, the first set of tiles and the second set of tiles arranged over an area of a device;
    calculating, for each tile in the first set of tiles, first thermal data for all tiles in the first set of tiles in response to each tile in the first set of tiles being individually excited based on a simulated power applied individually to each tile in the first set of tiles;
    calculating a first set of interpolations based on first thermal data to produce second thermal data for all tiles in the first set of tiles responding to each tile in the second set of tiles being individually excited;
    calculating a second set of interpolations based on the second thermal data to produce third thermal data for all tiles in the second set of tiles responding to each tile in the first set of tiles and the second set of tiles being individually excited;
    generating a thermal model from at least one of the first thermal data, the second thermal data, and third thermal data, wherein the thermal model simulates a thermal behavior of the device.

14. The method as in claim 13 wherein the thermal model simulates the thermal behavior in response to inputs that specify usage scenarios for the device and wherein the thermal data includes temperature data and response times for reaching a steady state temperature.

15. The method as in claim 13 wherein the device comprises at least one integrated circuit and wherein the first set of tiles are evenly distributed over the area of the device and wherein the number of tiles in the first set of tiles is less than 50% of the number of tiles in the second set of tiles.

16. The method as in claim 13 wherein the first set of interpolation comprises a first set of response surface fittings and the second set of interpolations comprises a second set of response surface fittings and wherein each of the tiles in the first set of tiles and in second set of tiles represents a portion of the device having known circuitry and wherein at least some of the tiles are powered in a first set of usage scenarios and are not powered in a second set of usage scenarios.

17. The method as in claim 16 wherein the first set of usage scenarios are associated with one or more power maps of the device that define power levels of components in the device which in turn specify power levels of tiles within the component.

18. The method as in claim 16 wherein the first set of usage scenarios are associated with one or more chip thermal module of the device that define power levels of components in the device which in turn specify power levels of tiles within the components.

19. The method as in claim 13 wherein the method further comprises:
    simulating the thermal behavior of the device by receiving power levels, from one of a power map or a chip thermal model for a given usage scenario of the device, as one or more inputs to the thermal model.

20. The method as in claim 19 wherein the one or more inputs comprise a power throttling or thermal management throttling for the given usage scenario.

21. The method as in claim 20 wherein the thermal model is generated as a state space model.

22. The method as in claim 21 wherein the method further comprises:
    adjusting at least one of the power or thermal management throttling and then simulating against the thermal behavior of the device.

23. The method as in claim 13 wherein the calculating of the first thermal data comprises computational fluid dynamics based on structural data about the device that includes data about cooling characteristics of the device.

24. The method as in claim 13 wherein the method further comprises:
    calculating adjustments for temperatures near each tile in the first of tiles to derive the first thermal data.

25. A non-transitory machine readable medium storing executable program instructions which when executed by a data processing system cause the data processing system to perform a method, the method comprising:
    defining, for use in computations that create a model, a first set of tiles and a second set of tiles, the first set of tiles and the second set of tiles arranged over an area of a device;
    calculating, for each tile in the first set of tiles, first thermal data for all tiles in the first set of tiles based on a simulated power applied individually to each tile in the first set of tiles;
    extending the first thermal data to create second thermal data for all of the tiles in the second set of tiles, wherein the extending comprises calculating, from the first thermal data, a set of interpolations, for all tiles in the first set of tiles, that indicate a response to each tile in the second set of tiles being individually excited;
    calculating a thermal model from the first thermal data and the second thermal data, the thermal model providing a resolution of less than 25 microns and for use with simulations that simulate dynamic thermal management with usage scenarios over time.

* * * * *